United States Patent [19]

Drong et al.

[11] 3,908,457

[45] Sept. 30, 1975

[54] HIGH ENERGY LASER POWER METER

[75] Inventors: Michael C. Drong, Ventura, Calif.; William M. Moeny, Albuquerque, N. Mex.

[73] Assignee: The United States of America as represented by the Secretary of the Navy, Washington, D.C.

[22] Filed: June 7, 1974

[21] Appl. No.: 477,400

[52] U.S. Cl................................. 73/190 R; 250/338
[51] Int. Cl......................... G01k 17/00; G01k 1/16
[58] Field of Search............. 73/190 R, 190 H, 355; 250/338, 340, 352

[56] References Cited

UNITED STATES PATENTS 3,670,570  6/1972  Briones ............................... 73/190

Primary Examiner—Herbert Goldstein
Attorney, Agent, or Firm—Richard S. Sciascia; J. M. St. Amand

[57] ABSTRACT

A device for measuring the power of a laser beam by measuring the rate of sublimation of a subliming solid irradiated by the laser.

10 Claims, 2 Drawing Figures

HIGH ENERGY LASER POWER METER

BACKGROUND OF THE INVENTION

The purpose of the present invention is to measure the power and energy output of CW or pulsed high energy lasers, or other types of directed high energy sources.

During the development and testing of high energy lasers, it is often desired to measure the power of the laser output beam. However, such measurement has been very difficult in the past due to the lack of suitable equipment capable of withstanding the intense power densities typical of high energy lasers. Usually, such power measuring techniques utilize some method of attenuating the beam prior to allowing the beam to fall on the detector. Other approaches for measuring the power output of pulsed lasers involve the use of a calorimeter to measure total energy and a radiometer to measure relative scattered intensity from the calorimeter. No prior art method is available to measure beam power directly.

SUMMARY OF THE INVENTION

This invention is for measuring the power of a laser beam by measuring the rate of sublimation of a subliming solid that is being irradiated by the laser. The laser beam radiation is converted to heat within a hohlraum, i.e., a cavity with a relatively small entrance, made from frozen $CO_2$, for example, and the incident power is determined by measuring the rate of change of the weight of the subliming solid.

DETAILED DESCRIPTION OF THE PREFERRED EMBODIMENT

Figure 1:
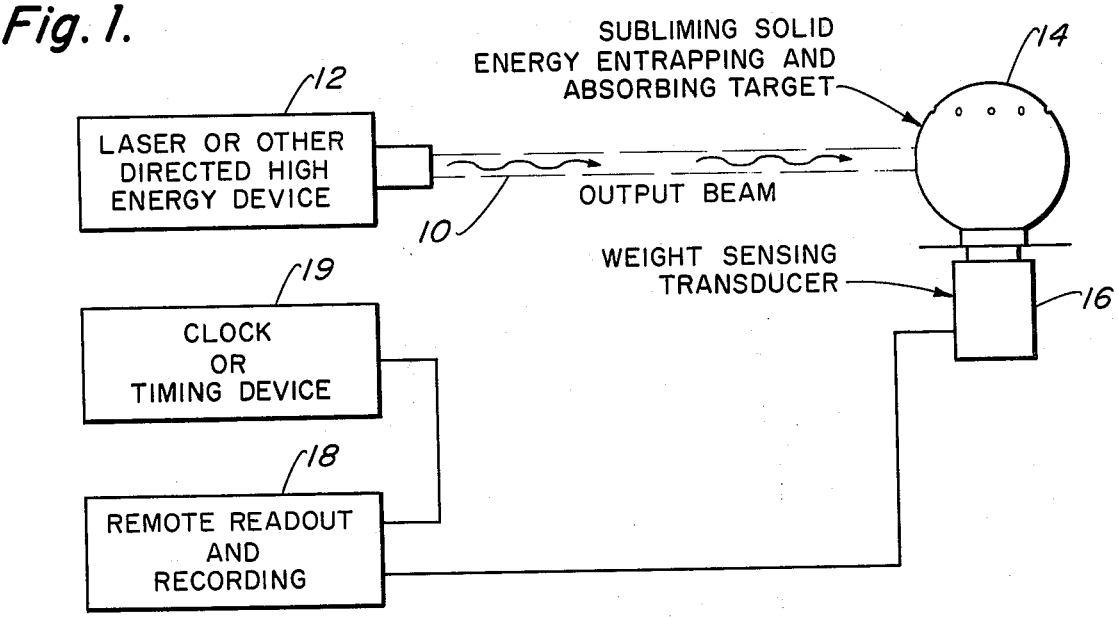
FIG. 1 is a schematic diagram showing one embodiment for use of the high energy laser power meter of this invention.
Figure 2:
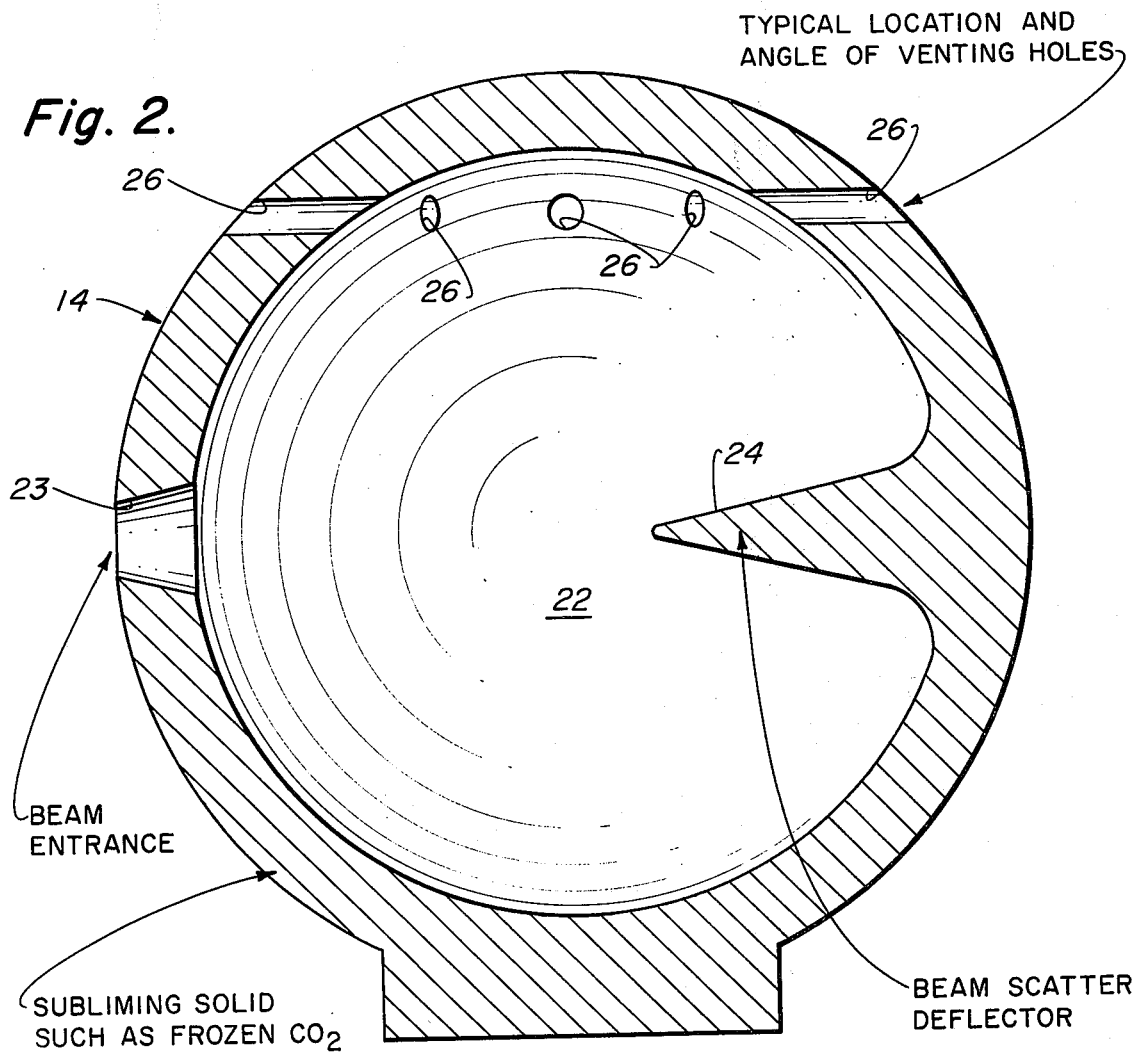
FIG. 2 shows a half-section side-view of a hohlraum, an energy entrapping and absorbing target device made of a subliming solid, as used in FIG. 1.

The basic purpose of this invention is to measure the power of a laser or similar beam by measuring the rate of sublimation of a subliming solid that is being irradiated by the laser. A subliming solid is a solid that turns directly into a gas upon application of heat, without going through the melting stage. Dry ice (frozen $CO_2$) is a good example of a subliming solid. The rate of vaporization of the subliming solid is proportional to the rate of energy absorption, i.e., absorbed power, of the solid. FIG. 1 shows schematically a typical use of the high energy laser power meter of this invention. A high energy radiation beam 10 from a laser or other type of directed high energy device 12 is directed into a subliming solid target 14 which entraps and absorbs the radiation energy. The laser beam radiation is converted to heat within the subliming solid, turning some of the subliming solid directly into a gas; then the incident power is determined by measuring the rate of change of the weight of the subliming solid. The incident radiation is "trapped" within target 14 to reduce losses due to scattering or reflection of the beam by constructing the target in the form of a hohlraum; that is, a cavity with a relatively small entrance. FIG. 2 shows a half-section side-view of a hohlraum type target 20. Light entering the cavity 22 via beam entrance 23 is scattered from a beam scatter deflector 24 and the interior walls repeatedly until absorbed. Only the rate of weight change of the subliming solid target 14 need be measured to thus compute the incident power. The change of weight of target 14 is sensed by a transducer 16, for example. Several types of transducers can be used to sense the weight change. Typical such transducers would be piezoelectric; Bourbon tube with a displacement sensor that can be resistive, capacitive or inductive; accelerometers; or displacement sensors combined with springs. To measure the power of the laser beam 10, a time resolving weight measuring system, involving a remote readout and recorder 18 and a timing device 19, for example, is required to measure the rate of change of weight of the hohlraum target 14. For this reason, time and weight should be recorded simultaneously on a recording device 18, such as a strip-chart recorder or magnetic tape recorder. Energy measurements can be made by measuring the weight of the hohlraum before and after irradiation, i.e., the total weight change, by means of weight sensing transducer 16.

The hohlraum itself can be in the form of a hollow sphere with a small beam entrance hole in one side, as shown in FIG. 2. The laser beam 10 enters hole 23 into cavity 22 and is scattered by the wedge or cone-shaped beam scatter deflector 24 affixed to the rear of the cavity. Deflector wedge 24 serves the purpose of scattering the light throughout cavity 22, causing sublimation to occur evenly inside the cavity. Deflector wedge 24 also prevents radiation losses due to light being reflected back out the cavity entrance 23. Additionally, the wedge prevents burn-through or excessive sublimation in the hohlraum rear wall directly opposite the cavity entrance. Deflector 24 may be of any suitable shape. Ventilation ports 26 are provided in the cavity for the escape of gas as it is generated by sublimation of the solid walls of target 20 and to reduce the buildup of absorbing gas within the cavity. These ports 26 are at an angle and location as to be shielded so that they do not provide an escape point for any scattered radiation within cavity 22. Forced ventilation using a gas transparent to the laser radiation, such as dry nitrogen for 10.6 um radiation, can be used to clear the cavity of absorbing gas, if desired.

The hohlraum 14 can be of almost any configuration: spherical, cylindrical, cubical, or other suitable shape. The only requirement is for a cavity with a small entrance, ventilation ports, and a scattering wedge or cone to provide uniform sublimation.

This invention provides a means for directly measuring high energy laser power where no previous method has existed. The techniques disclosed can be adopted for a variety of laser wavelengths and either CW or pulsed lasers. Also, energy contained in a pulse or radiation from a high energy laser is directly measurable with this technique.

Many alternative materials and construction techniques can be used. A variety of different solids can be used as the subliming material, depending on the application and facilities used. For proper functioning some sublimates may have to be cooled while others may have to be heated, depending on the application and laser light wavelength. A list of sublimates for various applications are shown in Table I.

Table I

Sublimates for High Energy Laser Power Meter:

| Sublimate | Sublimate Temperature |
| --- | --- |
| $CO_2$ (dry ice) | 195°K |
| $C_2H_2$ | 189°K |
| $SiF_4$ | 178°K |
| $SF_6$ | 210°K |
| $SeF_6$ | 227°K |
| $TeF_6$ | 234°K |
| C (solid carbon) | 298°K |
| $UF_6$ | 330°K |
| $PCl_5$ | 432°K |
| $Al_2C_6$ | 453°K |
| $SeO_2$ | 595°K |
| $ZrCl_4$ | 606°K |
| $P_4F_{10}$ | 632°K |

The above table gives examples of solid sublimates that can be used with this invention; combinations thereof, and other suitable sublimates can also be used.

The internal configuration of the hohlraum also can have almost any shape: spherical, cylindrical, even cubical type internal configurations can be used. A cavity with a small entrance is required so as to trap the incident radiation. A deflector 24, such as a parabolic wedge or a cone, at the back of the inside of the hohlraum opposite the entrance is desirable to assist in initial scattering of the incident radiation. Venting of the hohlraum 14 to release the gas generated by sublimating can also be accomplished in a variety of ways, e.g., radial venting, side venting, etc., and should include shielding of the vents to prevent any escape of internally scattered radiation. Forced ventilation, as mentioned, may be appropriate for some high-power laser applications.

Any constant rate of sublimation due to environmental conditions can be accounted for — so selection of a solid subliming at room temperature represents no obstacle to the use of this concept. Also, the outer walls of the hohlraum may be encased in a housing except at the beam entrance 23 and ventilation ports 26 to prevent any sublimation of the exterior walls of the hohlraum. Otherwise, the entire device can be self-supporting and used within a suitable environment which would prevent or take into account any environmental sublimation.

It should be noted that the use of this radiation beam power measuring device is not restricted to high energy lasers, since the device can be utilized with other directed high energy devices such as microwave projectors, ultrasonic projectors, carbon arcs, etc.

Obviously, many modifications and variations of the present invention are possible in light of the above teachings. It is therefore to be understood that within the scope of the appended claims the invention may be practiced otherwise than as specifically described.

We claim:

1. A system for directly measuring the output beam power of high energy lasers and other directed high energy devices comprising:
   a. a target means made from a subliming solid material for entrapping and absorbing the energy of an incident output beam from a high energy device being measured;
   b. the incident energy from said output beam being converted to heat within said subliming solid target means, changing a portion of the subliming solid material directly into gas;
   c. means for venting said gas from said target means;
   d. means for measuring the rate of change of weight of said subliming solid target means to compute the incident power of said output beam, the rate of vaporization of said subliming solid target means being proportional to the rate of power absorption of the subliming solid material.

2. A system as in claim 1 wherein said subliming solid material is frozen $CO_2$.

3. A system as in claim 1 wherein said subliming solid material comprises any of the following solid sublimates:
   $CO_2$, $C_2H_2$, $SiF_4$, $SF_6$, $SeF_6$, $TeF_6$, C, $UF_6$, $PCl_5$, $Al_2C_6$, $SeO_2$, $ZrCl_4$, $P_4F_{10}$, and combinations thereof.

4. A system as in claim 1 wherein said means for measuring the rate of change of weight of the subliming solid material to compute the incident power of the high energy device output beam, comprises:
   a. a transducer means for measuring the weight of said subliming solid target means;
   b. remote readout, recording and timing means connected to said transducer means for measuring the rate of change of weight of the subliming solid target material.

5. A system as in claim 1 wherein said subliming solid target is a hohlraum type target.

6. A system as in claim 1 wherein said subliming solid target comprises:
   a. an enclosed cavity having interior walls which consist of subliming solid material;
   b. a small beam entrance hole in one wall of said enclosed cavity;
   c. a deflector means, also of subliming solid material, affixed to the interior rear wall of said cavity directly opposite said beam entrance hole for scattering the radiation energy from said beam throughout said cavity, said deflector means causing sublimation to occur uniformly throughout the cavity and preventing energy losses due to beam radiation being reflected back out through the beam entrance hole, said deflector means also preventing excessive sublimation of said rear wall directly opposite to the beam entrance hole;
   d. ventilation means provided through the walls of said cavity for eliminating any of the gas as it is generated by sublimation of said subliming solid target material.

7. A system as in claim 6 wherein said ventilation means is shielded to prevent any escape of scattered radiation from within said cavity.

8. A system as in claim 6 wherein the shape of said cavity is spherical.

9. A method for directly measuring the output beam power of high energy lasers and other directed high energy devices, comprising:
   a. directing the output beam of the high energy device to be measured into a cavity within a target made from a subliming solid material;
   b. measuring the rate of change of the weight of the subliming solid target to determine the incident power of said output beam.

10. The method as in claim 9 wherein said subliming solid material is selected from any of the following solid sublimates:
    $CO_2$, $C_2H_2$, $SiF_4$, $SF_6$, $SeF_6$, $TeF_6$, C, $UF_6$, $PCl_5$, $Al_2C_6$, $SeO_2$, $ZrCl_4$, $P_4F_{10}$, and combinations thereof.

* * * * *